D. F. ROACH.
COMBINATION NEST PROTECTOR AND TRAP NEST.
APPLICATION FILED SEPT. 9, 1916.
1,214,827.  Patented Feb. 6, 1917.
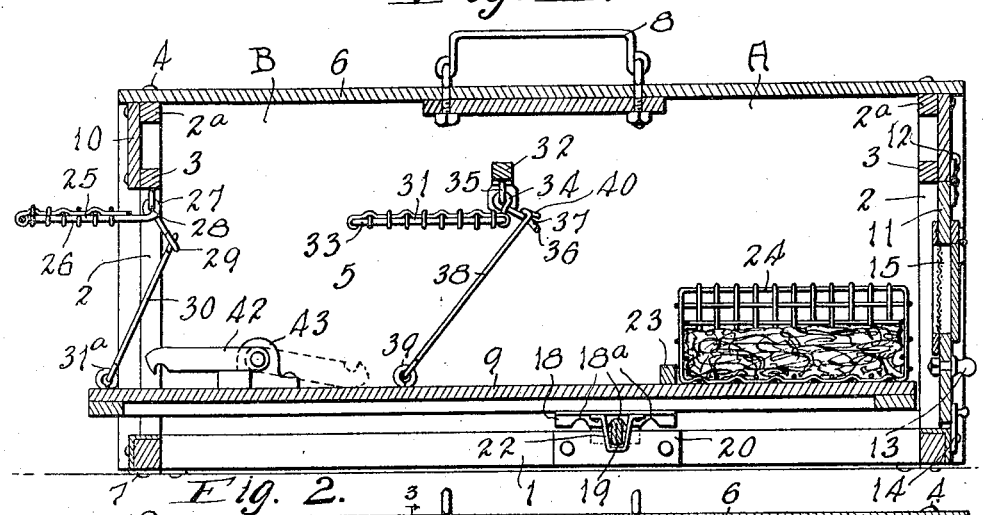
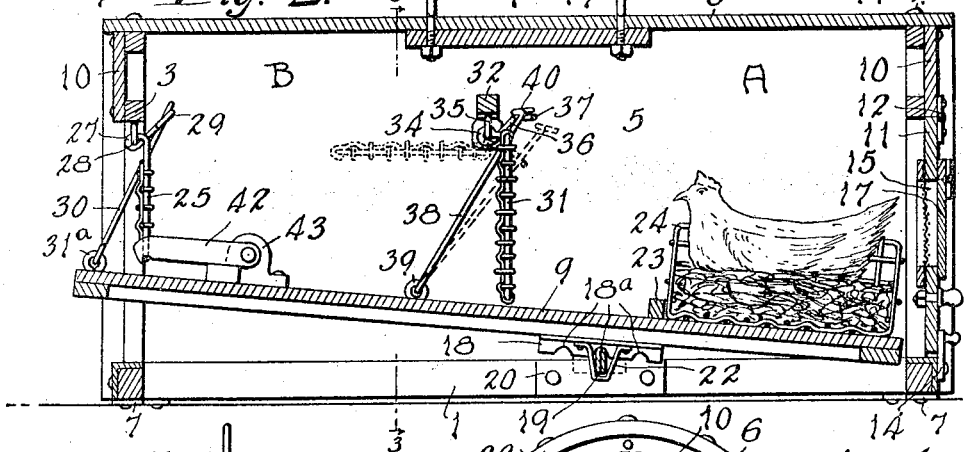
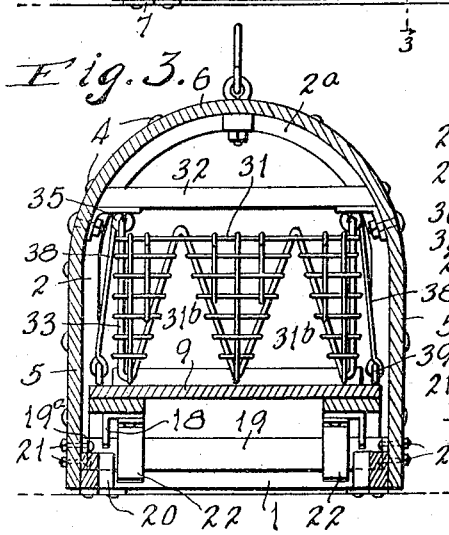
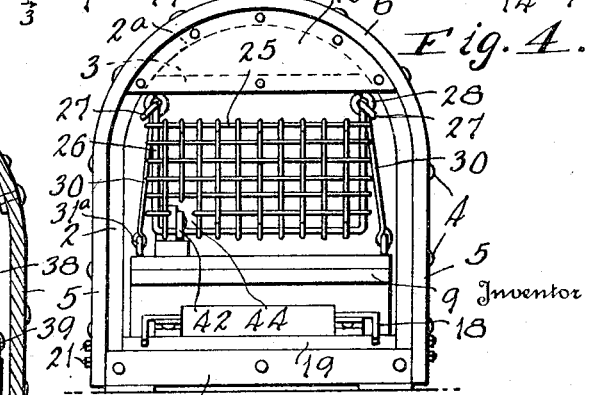
D. F. ROACH ived at Kansas City, in the county of Jackson, State of Missouri, have invented a new and useful Combination Nest-Protector and Trap-Nest; and I do hereby declare the following to be a full, clear, and exact description of the invention, such as will enable others skilled in the art to which it appertains to make and use the same.

UNITED STATES PATENT OFFICE.

DAVID F. ROACH, OF KANSAS CITY, MISSOURI.

COMBINATION NEST-PROTECTOR AND TRAP-NEST.

1,214,827. Specification of Letters Patent. Patented Feb. 6, 1917.

Application filed September 9, 1916. Serial No. 119,184.

*To all whom it may concern:*

Be it known that I, DAVID F. ROACH, a citizen of the United States, residing at Kansas City, in the county of Jackson, State of Missouri, have invented a new and useful Combination Nest-Protector and Trap-Nest; and I do hereby declare the following to be a full, clear, and exact description of the invention, such as will enable others skilled in the art to which it appertains to make and use the same.

The present invention relates to a combination nest protector and trap nest, and has for its object to provide a device of this character which embodies novel features of construction whereby it will effectively prevent the disturbance of laying and setting hens while upon the nest, and will prevent trapped hens from tramping upon and breaking the eggs when the device is used as a trap nest.

Further objects of the invention are to provide a nest protector and trap nest which is comparatively simple and inexpensive in its construction, which can be easily carried from place to place, which is rainproof, sunproof and verminproof, and which is dependable in its operation.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a longitudinal sectional view through a nest protector and trap nest constructed in accordance with the invention. Fig. 2 is a similar view showing the position of the platform when a hen is upon the nest and the front gate latched, the nest guard being shown by dotted lines as swung outwardly. Fig. 3 is a transverse sectional view through the device. Fig. 4 is a front view with the gate in a closed position.

Corresponding and like parts are referred to in the following description and indicated in all the views of the drawings by the same reference characters.

Referring to the drawings, which illustrate one embodiment of the invention, the numeral 1 designates a rectangular basal frame, and 2 upright end frames which project from the basal frame and preferably have the curved tops $2^a$, horizontal cross bars 3 being disposed just below the said curved tops. A sheet of wall board or other suitable material is bent around the top and sides of the end frames 2 and secured thereto, as well as to the sides of the basal frame 1, by suitable fastening members 4, thereby providing the sides 5 and top 6 of the device. The corners of the basal frame 1 and end pieces 2 may be reinforced by suitable angle plates 7, thereby imparting a rigid construction to the framework without the necessity of making the same heavy and cumbersome. A handle 8 is shown as applied to the top 6 for convenience in carrying the nest from place to place.

A tilting platform 9 is arranged within the housing just described, said platform preferably projecting slightly through the front end of the nest housing. Pieces 10 of wall board or the like are applied to the end frames 2 between the curved tops $2^a$ and cross bars 3 thereof, and the back of the nest housing is normally closed by a door 11 which is hinged to the piece 10, as indicated at 12. A knob 13 is provided for manipulating the door, and a latch 14 normally holds the door in a closed position. An air vent 15 is preferably provided in the door 11, and a piece of wire netting may be stretched across the air vent, said air vent being closed in cold and stormy weather by a flap 17.

The sides of the tilting platform 9 are provided at points toward the rear ends thereof with downwardly projecting bearing plates 18, each of which is provided in its lower edge with a series of triangular notches $18^a$. A selected set of these notches $18^a$ is designed to engage the comparatively sharp upper edge of a fulcrum bar 19 which extends transversely across the housing, resting upon blocks 20 which are secured to the sides of the basal frame 1, and terminating at its extremities in oppositely extending flanges $19^a$ which fit against the inner faces of the sides 5 and are secured thereto by fastening members 21. The platform 9 is thus pivotally mounted so that it is susceptible of a pivotal movement, the forward end of the platform being considerably larger than the rear end thereof so as to normally overbalance the latter and drop by gravity to the lower limit of its movement. Looped keepers 22 are pendent from opposite sides of the swinging platform 9 and extend loosely around the fulcrum bar 19, thereby preventing the tilting platform from being lifted out of position or accidentally displaced. The rear end of the platform 9 is provided upon the upper face thereof with a seat 23 which is adapted to engage and position a nest 24, said nest being preferably formed of wire netting, as indicated, so as to be verminproof. As previously stated, the forward end of the tilting platform normally overbalances the rear end thereof, although the weight of the hen upon the nest 24 reverses the normal relation between the two ends of the platform, so that the rear end of the platform is caused to drop to the lower limit of its movement.

A front gate is pendent from the cross bar 3 of the front frame 2 and pivotally connected thereto so as to swing upwardly and outwardly into a substantially horizontal position when the nest is unoccupied. This front gate 25 may be conveniently formed of wire netting which is fitted upon the U-shaped frame 26, the sides of the frame having the ends thereof coiled to provide loops 27 which engage eyes 28 projecting from the cross bar 3, and being provided with angularly disposed extensions providing crank arms 29 which are connected by links 30 to eyes 31$^a$ on corresponding sides of the platform 9. The arrangement of the links and crank arms is such that when the forward end of the platform is in a lowered position the front gate 25 is opened outwardly, although when the forward end of the platform is caused to swing upwardly by the weight of the hen upon the nest 24, the gate 25 is swung downwardly into a closed position.

A swinging nest guard 31 is arranged just in front of the nest 24, being pendent from an intermediate cross bar 32. This nest guard 31 may be conveniently formed of wire netting which is fitted upon a wire frame 33, the sides of the frame being coiled to provide eyes 34 which engage screw eyes 35 projecting from the cross bars 32, and terminating in angularly disposed extensions forming crank arms 36 which have eyes 37 at the extremities thereof. Links 38 pass loosely through the eyes 37, being pivotally connected at their lower ends to the platform 9, as indicated at 30, and terminating at their upper ends in heads 40 which are too large to pass through the eyes 37 and engage the latter to swing the nest guard forwardly and upwardly into an inoperative position when the nest is unoccupied and the forward end of the platform is depressed. However, when the nest is occupied and the forward end of the platform is raised, the nest guard 31 drops downwardly by gravity into operative position, although it can be swung forwardly independent of the movements of the platform. Attention may also be directed to the fact that the swinging edge of the nest guard is provided with notches or cut away portions 31$^b$ through which the head of a hen can be inserted, thereby bringing the shoulders of the hen in direct engagement with the side portions of the notches so that the guard can be easily swung outwardly to permit the passage of a trapped hen from the rear nest receiving compartment A to the outer compartment B. Movement of the swinging nest guard in the opposite direction is prevented by the engagement of the heads 40 at the upper ends of the links 38 with the eyes 37 of the crank arms 36, so that after a trapped hen has once passed from the nest compartment A into the outer compartment B, she can not again get back into the nest compartment, and is thereby prevented from tramping upon or otherwise breaking the egg.

A latch 42 is pivotally mounted upon a block 43 which is applied to the forward end of the tilting platform 9 at one side thereof. When this latch 42 is swung forwardly into operative position, the beveled nose thereof will project through an opening 44 in the front gate 25 when the latter is closed, being lifted by engagement with the frame 26 until the notched portion of the latch positively engages the frame to lock the gate in a closed position. When the device is used as a trap nest, the latch 42 is swung forwardly into an operative position, so that when the platform 9 is tilted and the gate 25 closed, the latter is engaged by the latch, thereby preventing the return of the parts to normal position until the latch is manually released. After laying an egg, the hen will attempt to leave the nest, and will enter the outer compartment B, swinging the nest guard 31 outwardly and forwardly for this purpose. The hen will then find herself trapped in the outer compartment, and she will not be again able to enter the nest compartment A, since the guard 31 will not swing rearwardly.

When it is not desired to trap the hen in the nest, the latch 42 is swung rearwardly into an inoperative position. The operation of the gate 25 and nest guard 31 then prevents the disturbance of a laying or setting hen. A setting hen can leave the nest at any time to get food, and then return, although as long as she is upon the nest the gate 25 is closed, so that there is no danger of the hen being disturbed by cats, dogs, or other chickens. The nest 24 can be easily removed through the back of the housing, and any eggs can be readily removed by opening the door 11.

Having thus described the invention, what I claim as new and desire to secure by Letters Patent, is:—

1. A device of the character described, including a housing provided with an entrance, a tilting platform pivoted at a point between its ends and arranged with a heavy end toward the entrance, a nest on the opposite end of the tilting platform, a gate arranged at the entrance and operatively connected to the platform, and a movable nest guard spaced from the gate for coöperation therewith to provide a trap compartment, said nest guard being also operatively connected to the platform.

2. A device of the character described, including a housing provided with an entrance, a tilting platform pivoted between its ends and arranged with a heavy end toward the entrance, a nest on the opposite end of the platform, a swinging gate for the entrance, an operative connection between the gate and the platform, an outwardly swinging nest guard arranged in a spaced relation to the gate for coöperation therewith to provide a top compartment, an operative connection between the nest guard and the platform, said nest guard being adapted to swing outwardly into an open position independently of the platform, and a latch for locking the gate in a closed position.

3. A device of the character described, including a housing provided with an entrance, a tilting platform pivoted between its ends and arranged with a heavy end toward the entrance, a nest on the opposite end of the tilting platform, a gate at the entrance, an operative connection between the gate and swinging platform, an outwardly swinging nest guard arranged in a spaced relation to the gate so as to coöperate therewith to provide a nest compartment, said nest guard having notched portions in the swinging edge thereof to receive the head and neck of a hen, an operative connection between the nest guard and the platform, whereby the nest guard swings into operative position when the gate is closed, but can swing outwardly into inoperative position independently of the platform, and a latch for locking the gate in a closed position.

4. A device of the character described, including a housing provided with an entrance, a tilting platform pivotally mounted between its ends and arranged with a heavy end toward the entrance, a nest on the opposite end of the tilting platform, a swinging gate at the entrance, an operative connection between the gate and the platform, for swinging the gate into a closed position when the platform is tilted by the weight of a hen in the nest, an outwardly swinging nest guard arranged in a spaced relation to the gate for coöperation therewith to provide a trap compartment, a crank arm projecting from the nest guard and terminating in an eye, a link connected to the platform and passing loosely through the eye, the extremity of the link terminating in a head which engages the eye to open the nest guard when the gate is opened, said nest guard closing automatically when the tilting of the platform closes the gate and being movable outwardly into an open position independently of the platform, and a latch for holding the gate in a closed position.

In testimony whereof I have signed my name to this specification in the presence of two subscribing witnesses.

DAVID F. ROACH.

Witnesses:
D. L. MAGEE,
E. F. CLARY.

Copies of this patent may be obtained for five cents each, by addressing the "Commissioner of Patents, Washington, D. C."